United States Patent
Vatani et al.

(10) Patent No.: US 12,409,605 B2
(45) Date of Patent: Sep. 9, 2025

(54) APPARATUS AND METHOD TO PROVIDE CONDITIONING TO A DEPOSITED POWDER

(71) Applicant: Sakuu Corporation, San Jose, CA (US)

(72) Inventors: Morteza Vatani, Los Gatos, CA (US); Seyed Mohammad Sajadi, Sunnyvale, CA (US); David Paul Wanamaker, San Jose, CA (US); Kevin Nesdahl, Blaine, MN (US); Tim Debruin, Stillwater, MN (US); Brian Lindahl, Somerset, WI (US); Justin Carroll, Vadnais Height, MN (US)

(73) Assignee: Sakuu Corporation, San Jose, CA (US)

( * ) Notice: Subject to any disclaimer, the term of this patent is extended or adjusted under 35 U.S.C. 154(b) by 5 days.

(21) Appl. No.: 18/074,236

(22) Filed: Dec. 2, 2022

(65) Prior Publication Data

US 2023/0226764 A1    Jul. 20, 2023

Related U.S. Application Data

(60) Provisional application No. 63/299,816, filed on Jan. 14, 2022.

(51) Int. Cl.
*B29C 64/314* (2017.01)
*B29C 64/141* (2017.01)
(Continued)

(52) U.S. Cl.
CPC .......... *B29C 64/314* (2017.08); *B29C 64/141* (2017.08); *B29C 64/218* (2017.08);
(Continued)

(58) Field of Classification Search
CPC ... B29C 64/314; B29C 64/393; B29C 64/141; B29C 64/218; B33Y 10/00; B33Y 30/00; B33Y 50/02; B33Y 40/10
See application file for complete search history.

(56) References Cited

U.S. PATENT DOCUMENTS 2,837,440 A * 6/1958 Boivin ................. D06N 3/0052
521/61
3,081,269 A * 3/1963 Shannon ................ C08J 9/0061
521/181
(Continued)

FOREIGN PATENT DOCUMENTS

EP   3461940 A1 *  4/2019  .......... D04H 1/4266
EP   3919260 A1   12/2021

OTHER PUBLICATIONS

Translation text of EP-3461940-A1 provided by Clarivate (Year: 2017).*
(Continued)

*Primary Examiner* — Galen H Hauth
*Assistant Examiner* — John Robitaille
(74) *Attorney, Agent, or Firm* — Arman Khosraviani (57) ABSTRACT

An improved apparatus and method provide conditioning to a powder deposited on a substrate (e.g., a web), for example, by wetting the powder in a 3D printing apparatus. To achieve this in an exemplary implementation, a wetting apparatus is located between a powder dispenser and at least one top calendering roller in a direction of movement of the substrate, wherein the wetting apparatus is configured to apply a wetting agent to the powder on the substrate before the powder passes through the calendering roller. The wetting agent is comprised of a material which increases cohesiveness of the powder to prevent the powder from adhering to the top roller. In a particular implementation, the wetting agent is steam confined to an area of the substrate where the powder passes through the wetting apparatus, without wetting other areas of the substrate which are not in the wetting apparatus.

20 Claims, 5 Drawing Sheets

(51) Int. Cl.
  *B29C 64/218* (2017.01)
  *B29C 64/393* (2017.01)
  *B33Y 10/00* (2015.01)
  *B33Y 30/00* (2015.01)
  *B33Y 40/10* (2020.01)
  *B33Y 50/02* (2015.01)

(52) U.S. Cl.
  CPC ............ *B29C 64/393* (2017.08); *B33Y 10/00* (2014.12); *B33Y 30/00* (2014.12); *B33Y 40/10* (2020.01); *B33Y 50/02* (2014.12)

(56) References Cited

U.S. PATENT DOCUMENTS

| | | | |
|---|---|---|---|
| 3,402,480 A * | 9/1968 | Geitz | A24B 3/12 34/619 |
| 5,876,550 A | 3/1999 | Feygin et al. | |
| 6,213,168 B1 * | 4/2001 | Gaylo | B29C 41/12 141/73 |
| 9,475,234 B2 * | 10/2016 | Morikawa | B29C 64/35 |
| 2005/0104241 A1 | 5/2005 | Kritchman et al. | |
| 2006/0032840 A1 * | 2/2006 | Bagavath-Singh | B23K 15/0086 219/121.64 |
| 2011/0190923 A1 | 8/2011 | Matsui et al. | |
| 2016/0243764 A1 | 8/2016 | Hays et al. | |
| 2020/0171752 A1 | 6/2020 | Rogren | |
| 2020/0307090 A1 | 10/2020 | Daniels et al. | |
| 2021/0008617 A1 | 1/2021 | Sachs et al. | |
| 2022/0032377 A1 | 2/2022 | Hudelson et al. | |

OTHER PUBLICATIONS

International Search Report and Written Opinion issued Apr. 24, 2023 in corresponding PCT/US23/60755 filed Jan. 17, 2023—12 pages.

* cited by examiner

APPARATUS AND METHOD TO PROVIDE CONDITIONING TO A DEPOSITED POWDER

TECHNICAL FIELD AND BACKGROUND

The present disclosure pertains to an improved apparatus and method to provide conditioning to a powder deposited on a substrate by lubricating/wetting the powder, for example, in a 3D printing apparatus. Specifically, in current binder jetting 3D printing, after powder deposition on a substrate, the powder on the substrate may be passed through rollers, such as a calendering system, for compaction. Previous techniques suffer from non-uniform compaction due to the powder sticking to a contacting roller or splitting of the powder between the roller and a carrier plate or substrate on which the powder is deposited. In all cases, this results in non-uniform part fabrication. Accordingly, there is a need for an arrangement for uniform compaction and preventing powder sticking and splitting during powder and pattern roller compaction, for example, in 3D printing, especially powder binder jetting (although the techniques described herein can also be applied to continuous material jetting systems). The practice of applying a lubricant and/or wetting agent to deposited powder to improve flowability of the powder, thereby aiding in compaction uniformity, and to minimize or control the tension between the substrate and the later-applied layers, has been discussed in U.S. application Ser. No. 17/375,781, which is hereby incorporated by reference.

SUMMARY OF THE INVENTION

In an implementation, an apparatus is provided including a powder dispenser configured to dispense powder onto a substrate, a calender comprised of a top roller, located above the powder on the substrate, and a conditioning apparatus located between the powder dispenser and the calender in a direction of movement of the substrate, wherein the conditioning apparatus is configured to apply a conditioning agent to the powder on the substrate before the powder passes through the calender, wherein the conditioning agent is comprised of a material which increases cohesiveness of the powder.

In another implementation, a method is provided including dispensing powder onto a substrate, applying a conditioning agent to the dispensed powder on the substrate before the powder passes through the calender, and compacting the powder, after the conditioning agent is applied, wherein the conditioning agent is comprised of a material which increases cohesiveness of the powder to provide for uniform compaction of the powder during compacting.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

In the present disclosure, an arrangement is provided to pretreat or condition powder before a calendering operation to ensure uniform compaction and preventing powder sticking to the top roller and splitting during powder and pattern roller compaction. These arrangements are particularly useful, for example in a 3D printing apparatus, especially powder binder jetting (although the techniques described herein can also be applied to the continuous material jetting, or to other powder deposition systems).

In particular, as described in a related provisional application by the Applicant (Application No. 63/299,867), entitled "Printing Method and Apparatus for Additive Manufacturing, Including In-situ Powder Regeneration," filed on Jan. 14, 2022, and which is hereby incorporated by reference, a platform for AM manufacturing has been developed which is a modular base machine that builds each layer separately. Each individual layer passes several apparatuses, and each apparatus has a unique function. One of these apparatuses includes compaction of the powder in a calendering operation while the deposited powder layers are still in the green non-cured stage. Thus, a method and an apparatus are disclosed herein which are particularly adapted to the new platform described in the above-noted related application. Specifically, in the platform described in this related application, due to the nature of the platform, the powder layers can be conditioned individually by the techniques discussed in the present disclosure, so it is possible to improve the calendering of the layers in the platform described in the above-identified related application.

The related application noted above describes a system and a method for applying powder to a substrate at a powder applying apparatus, removing first portions of the powder to create clean portions of the substrate between portions of deposited powder, moving the portions of deposited powder remaining on the substrate to a wetting apparatus and wetting the powder with a wetting agent at the wetting apparatus, passing the wetted portions of deposited powder through calendering rollers to compact the powder, cutting the substrate at the clean portions to create substrate segments each respectively including one of the portions of the deposited powder, moving the substrate segments having the portions of deposited powder, to a binder applying apparatus and applying a binder to the powder at the binder applying apparatus to harden the deposited powder into layers, transferring the substrate segments having the layers mounted thereon to respective carrier plates, and moving the carrier plates, with the substrate segments having the layers mounted thereon, to a stacking apparatus, and inverting each of the carrier plates in order to separate the layers from the substrate segments and to stack the layers individually on one another to form a multilayer product. The present disclosure can be incorporated into the system described in the related application as part of the calendering of the powder while it is in a green, non-cured stage in the overall 3D printing operation. It is noted that, although a certain order of steps is discussed above, the order of the steps could be changed, if desired, without departing from the scope of this disclosure.

Figure 1:
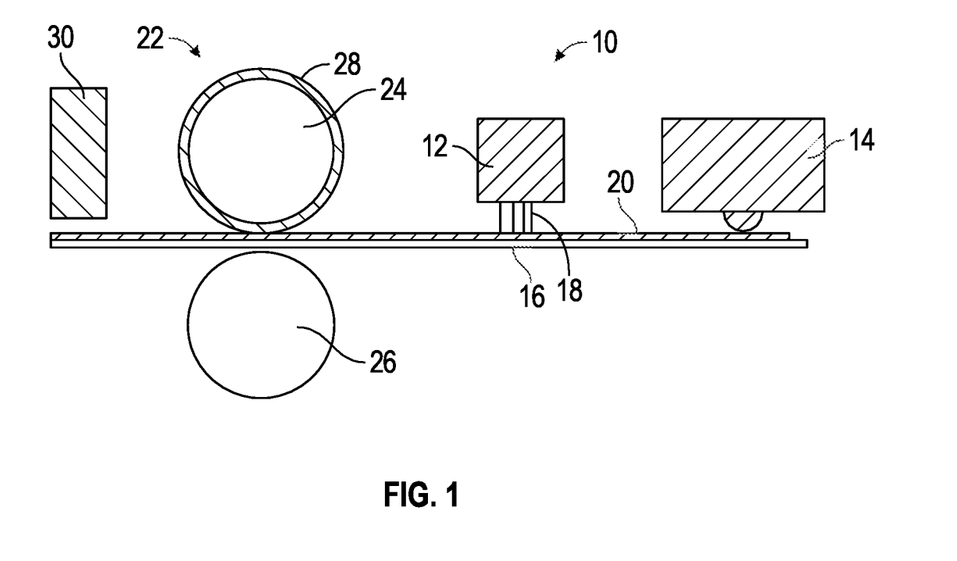
FIG. 1 shows a powder conditioning, lubrication, or wetting, apparatus located above a substrate in a 3D printing apparatus in accordance with aspects of the present disclosure.
Figure 2:
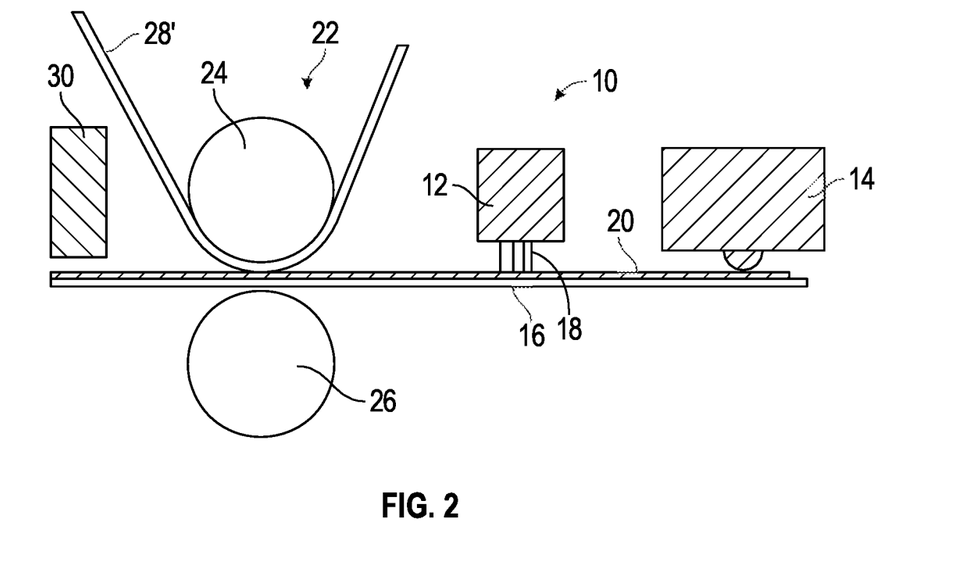
FIG. 2 shows another implementation of a powder conditioning, lubrication, or wetting, apparatus located above a substrate in a 3D printing apparatus in accordance with aspects of the present disclosure.

FIG. 1 shows a powder conditioning, lubrication, or wetting, apparatus 10 located above a substrate in a 3D printing apparatus in accordance with aspects of the present disclosure. FIG. 2 shows another implementation of such a powder conditioning, lubrication, or wetting, apparatus utilizing an alternative arrangement for powder compaction. Referring to FIGS. 1 and 2, a spray or inkjet print head 12 is positioned after a powder dispenser 14 on a carrier substrate 16 (e.g., a carrier conveyor belt) relative to the travel direction to spray or inkjet print a conditioning agent 18, for example a wetting agent, on powder 20 which has been deposited on the substrate 16 (noting that "substrate" is also referred to in the art as "web") by the powder dispenser 14. In the case of lubricating, a lubricating or wetting agent/liquid 18 with controlled surface tension, preferably with high surface tension, is deposited uniformly on the deposited powder 20. Thus, the deposited powder 20 is wetted by the controlled wetting agent 18. This wetting agent 18, by providing enough lubrication, helps uniform compaction of the powder 20 and prevents splitting of the powder by increasing internal cohesion, increasing cohesiveness of the powder. As will be described below with regard to a particular implementation, the wetting agent 18 can be steam generated from water. However, other wetting agents could be used, including other materials added to water or organic materials to help improve uniform compaction and internal cohesion of the powder for subsequent processing. Also, in an alternative implementation, the conditioning agent 18 could be applied by evaporation.

Referring to FIG. 1, to minimize the sticking or splitting of powder 20 during calendering, a controlled surface energy coating 28 can be applied to the surface of the top compaction roller 24 of the calender 22 (which also includes a lower compaction roller 26) to prevent splitting and sticking the powder 20 to the top compaction roller 24. FIG. 2 shows an alternative arrangement using a covering layer 28', such as a sheet rolled from a dispensing sheet roller, with a low surface energy applied to the top compaction roller 24 of the calender 22 or applied to another covering surface used during the calendering. The combination of the coating or the covering surface with controlled surface energy and a wetting agent 18 applied by the spray dispenser of the inkjet printer 12 prevents splitting and sticking the powder to the compaction roller 24. The amount of wetting agent 18 applied to the powder can be less than 10 wt %.

Still referring to FIGS. 1 and 2, after powder compaction by the calendering compaction rollers 24 and 26, and before patterning, the carrier substrate 16 with the compacted powder 20 may undergo a drying process by a dryer 30 to remove and evaporate the remaining wetting agent 18 that was applied by spraying or ink jetting and that has not already evaporated. The dryer 30 could be an IR lamp, hot air, or it could be a pulse dryer for faster drying.

Summarizing the above discussion of FIGS. 1 and 2 regarding the concept of single layer powder compaction, a dispenser 12 (e.g., the spray or inkjet print head) is provided for dispensing a conditioner, lubricant or wetting agent 18 to a layer of deposited powder 20. This conditioning agent, lubricant or wetting agent 18 can be deposited by using evaporation techniques, an inkjet, a spray or, as discussed below regarding a particular implementation, steam. The conditioning agent, for example, a lubricant/wetting agent 18 lubricates/wets the deposited powder 20 for uniform compaction and for preventing sticking and splitting, as discussed above. In addition, as discussed above, in supplement to the lubricant/wetting agent 18, a coating can be applied to the top roller 24 of the pair of compaction rollers 24 and 26, as shown in FIG. 1, or a cover sheet 28 can be applied between the top roller 24 and an upper surface of the deposited powder 20, as shown in FIG. 2, to further enhance the prevention of sticking to the top roller 24 or the splitting of the powder 20 during compaction by the calendering roller(s) 24 and 26. Also, it is noted that, although the implementations shown in FIGS. 1 and 2 show a pair of calendering rollers 24 and 26, in an alternative implementation a single top roller 24 can be used to press the powder layer 20 between the top roller 24 and the substrate 16. Alternatively, a solid support, such as a rigid plate (not shown), can be provided under the substrate 16 to operate in conjunction with a single top calendering roller 24 to compact the powder 20.

Referring to FIGS. 3-7, all of these pertain to a particular implementation of the principles discussed above, specifically using steam as the lubricant or wetting agent 18 for the powder 20. For convenience, in the following discussion the term wetting agent 18 will be used, rather the conditioner or lubricant, noting that the wetting of the powder 20 that results from the use of the wetting agent 18 has a specific conditioning effect, in this case a lubricating effect.

With regard to using steam as the wetting agent 18, in various experiments to implement wetting of the powder 20 prior to calendering, a variety of approaches were tried to find a wetting process that would not damage the dispersed powder 20, and that would provide sufficient lubrication to improve flowability, but not so much that the wetting agent spreads beyond the desired powder boundaries. Experiments were run using sprayers and fine misters, with different nozzles and types of nozzles. Although using such sprayers and fine misters improved the compaction and uniformity of the powder 20 following compaction in the calendering rollers 24 and 26, particularly when combined with coating 28 or covering 28' of the top roller with a low surface energy material, as shown in FIGS. 1 and 2, the results of some of these experiments were striations, pockets, and damage to the powder sample 20. Specifically, it was determined from these experiments that it was difficult to control the area of spray or the amount of water (or other wetting agent 18) applied to the surface of the powder 20.

Experiments were then run applying a steam form of water to the surface of the powder 20. It was determined that this method eliminated the above-noted issues regarding striations, pockets, and damage to the powder sample. The steam created an even, controllable, method of powder wetting. In other words, the steam serves as the wetting agent in this implementation and will be referred to hereinafter as steam 18'. The steam area was also very controllable using a steam chamber, as discussed below, so as to not wet the substrate area of powder 20 in portions of the substrate 16 outside the steam chamber. This eliminated powder damage in further processes downstream, following the powder compaction in the calendering rollers 24 and 26.

Figure 3:
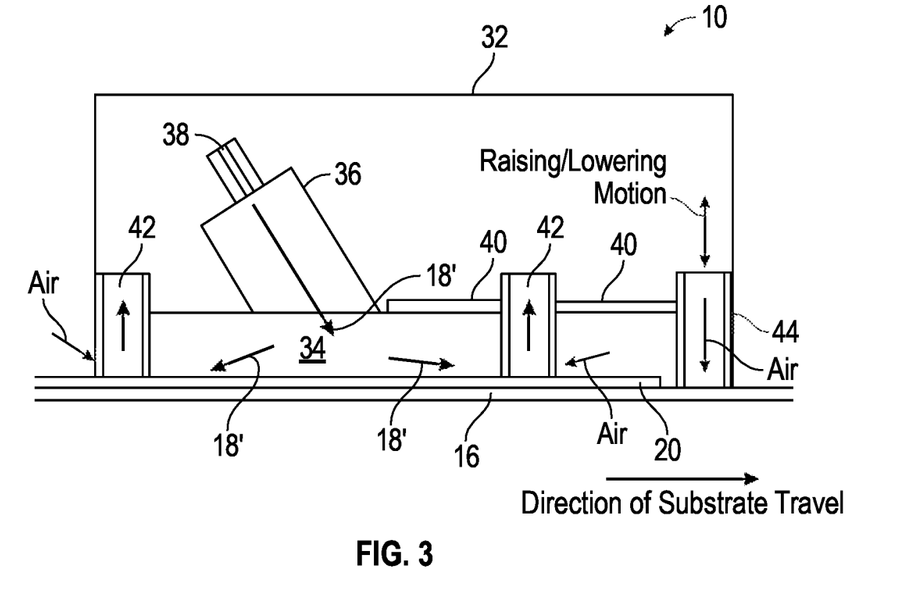
FIG. 3 shows a cutaway view of elements of a wetting apparatus, in accordance with aspects of the present disclosure.

FIG. 3 shows a cutaway view of elements of a conditioning apparatus, in this example a wetting apparatus 10. As can be seen in FIG. 3, the moving substrate 16, with a controlled thickness of powder 20 (typically controlled via a blade to level the powder, and/or devices such as rollers to promote uniformity of the deposited powder) enters the wetting apparatus 10. The wetting apparatus 10 (e.g., a steam housing 32 comprising a steam chamber 34) provides an isolated region within which generated steam 18' can be confined, and through which the substrate 16, with the powder 20 thereon, can pass. In other words, the steam 18' is limited to the portion of the substrate 16 within the steam chamber 34, leaving powder 20 on portions of the substrate 16 outside of the steam chamber 34 untouched by the steam 18'.

As illustrated in FIG. 3, the wetting apparatus 10 may comprise a steam housing 32 which contains all elements required for the wetting process. The steam housing 32, though optional, may serve several purposes as described in greater detail below, one of them being providing a safety feature, protecting the user from unintended exposure from the generated steam 18'. It may also provide a means of protecting all elements of the wetting process from unforeseen damage when the wetting apparatus 10 is moved away from the substrate 16.

Figure 7:
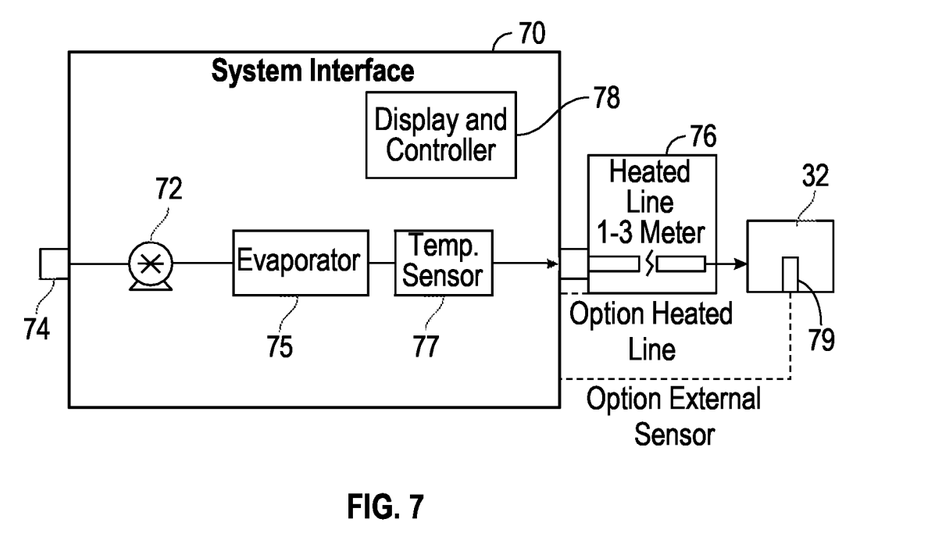
FIG. 7 shows a system interface for controlling the generation and characteristics of the steam applied to a steaming head in the wetting apparatus, in accordance with aspects of the present disclosure.

Steam 18' is initially generated using a steam generator (e.g., such as using an evaporator as shown in FIG. 7) that, in accordance with one implementation, will continue to produce steam 18' until instructed not to. The steam generator can be selected to provide a minimum steam flow/rate for applying steam to a steam source input 38, and the desired temperature range of the steam 18'. The generated steam 18' feeds into the steaming head 36 inside the steam housing 32 via the steam source input 38. The steam 18' travels down a heated tube (see FIG. 7) from the steam generator to the steam source input 38, and then into the steaming head 36 (e.g., a heated steam dispensing wand). The steaming head 36 may comprise one or more steam dispensing heads or nozzles which dispense steam 18' within the head 36. The steaming head 36 can be a wide triangle shaped object that coats the incoming powder 20 on the substrate 16 with the forced steam 18'. The dispensed steam 18' wets the powder 20 as it passes under the heated steam dispenser (i.e., the steaming head 36).

The width of the steaming head 36 is preferably at least the width of powder 20 distributed on the substrate 16, but slightly less than the width of the substrate 16 itself. Alternatively, the width of the steaming head 36 can be substantially the same width as the substrate 16. In one embodiment, the steaming head 36 is configured so that the steam 18' spreads out in a triangular fashion as it travels from the steam source input 38 to the powder 20 on the substrate 16.

In some implementations, a heater 40 can be attached to, or located adjacent to, the steam chamber 34 or, alternatively, to the steaming head 36 to help maintain the steam 18' in the steam chamber 34 and/or the steaming head 36. In some implementations, the heater 40 is shaped to conform to the shape of the steaming head 36. In other implementations, the heater 40 can be shaped differently than the steaming head 36, covering either a smaller area or a larger area than the width and height of the steaming head 36. The heater 40 can include a heater core passing through it that generates heat that spreads throughout the rest of the heater 40. A sensor (e.g., see FIG. 7) can be provided within the steam chamber 34 to activate the heater 40 as and when needed based on sensing the temperature and level of steam 18' being dispersed by the steaming head 36. In other implementations, the rate of steam production may be associated with the speed of the substrate 16 moving through the steam chamber 34. Sensors and controls can be incorporated inside the steam chamber 34 to cause the rate of steam production or the speed of the substrate 16 to be modified as needed to ensure that an appropriate amount of steam 18' is applied to the powder 20 so that it will remain intact during the subsequent compaction in the calendering rollers 24 and 26. Dynamic modification of steam generation may be enabled based on data received from the various sensors being fed back to the controls.

As shown in FIG. 3, the wetting apparatus 10 includes one or more vacuum apparatuses 42 within the steam housing 32, preferably at least one of which is adjacent the steaming head 36, that will remove excess vapor or any condensation that may occur outside the steam target area of the powder 20. The steam target area is the powdered area of the substrate 16 within the wetting apparatus 10. The vacuum apparatuses 42 may remove excess vapor or condensation out of the wetting apparatus 10, and/or control the vapor pressure/flow rate within the steam chamber 34. This in turn provides additional control of the moisture received by the deposited powder 20. The vacuum apparatuses 42 may open to the surface of the powder 20, but not all the way down to the substrate 16. In some implementations, the location of the opening can be varied by the user, or automatically based on data acquired via sensors, as dictated by application. The vacuum apparatuses 42 may also incorporate hydrophilic material (not shown), for example felt strips, to aid in the extraction of condensed water vapor. The hydrophilic material may be continuously wetted or saturated with an aqueous solution to aid in operation. Moisture received by the powder 20 can be controlled by optimizing the various parameters of the wetting apparatus 10 (including the pressure provided by the vacuum apparatuses 42) and the speed of the substrate 16 moving through the steam chamber 34.

As the substrate 16 traverses through the wetting apparatus 10, excess moisture, if any, on the "pure" substrate portions (e.g., those areas of the substrate 16 where no powder 20 is supposed to be deposited) will most likely have evaporated, so no additional excess water removal operation, other than the vacuum apparatuses 42, is required. However, in one implementation, as also shown in FIG. 3, a substrate cleaning actuator 44 can also be provided at the output of the wetting apparatus 10 to blow air onto the substrate 16 in areas where powder 20 is not deposited to clean off any excess powder that may have drifted onto those portions of the substrate 16. In one configuration, the substrate clean actuator 44 may dispense air all the way to the surface of the substrate 16.

In another configuration, as shown in FIG. 3, in order to accommodate the moving substrate, the substrate clean actuator 44 may be actuated such that it is lowered to the surface of the substrate 16 only during times that it is not disposed above powdered areas and raised to be above the surface of the powder 20 at other times. The timing of the raising and lowering may be timed based on the speed of the substrate 16, width of the powder segments, and width of the non-powdered segments. In other instances, the timing of the raising and lowering may be based on data received from sensors, such as image acquisition devices and the associated image processing required to determine the edges of powder, areas of powder and or the areas of "pure" substrate.

In an alternative configuration, one or more sensors located on the steam housing 32 may register an edge of powder 20 as it exits the steam housing 32. Once the edge has been registered, a cleaning tool (not shown), for example a flexible blade made of a soft "squeegee" style material, may be used to push and remove liquid from the surface of the substrate 16 where no powder 20 is supposed to be deposited. The tip of the squeegee style flexible blade is the only material to touch the substrate, so the material used for the flexible blade should be chosen as a material which will prevent damage to the substrate as the tip of the flexible blade scrapes over the substrate to remove powder from the substrate in the desired first portion. The material chosen for use as a flexible blade may also depend on the specific chemistry of the powder 20, with a desire to select a blade material to which the powder does not adhere or react. In one implementation, based on the speed of the moving substrate 16, the angle of approach of the blade may be adjusted, such that, as it traverses the substrate 16 from one side to the other, while the substrate 16 is moving, the cleaning tool traverses the substrate, traveling between two adjacent edges of powder 20 on the substrate, in a direction substantially orthogonal to the longitudinal sides of the substrate 16.

Figure 4:
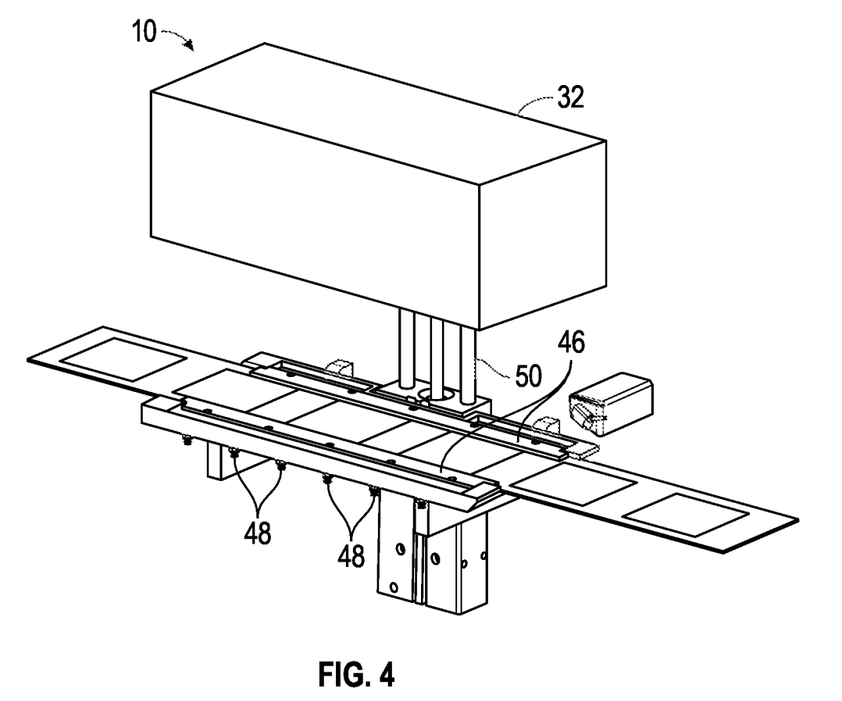
FIG. 4 shows a perspective view of an elevation mechanism for lifting the wetting apparatus off of the substrate, in accordance with aspects of the present disclosure.

As shown in FIG. 4, hydrophilic material can be provided, for example felt strips 46 which run parallel to the edges of the substrate 16. These felt strips 46 will trap condensation and allow it to be vacuumed up by the vacuum apparatuses 42. Alternatives to felt may include other materials which are able to collect moisture, and which does not damage the powder or substrate 16, materials such as sponge, "squeegee" material for example. In some implementations, the material strips may comprise two sides with each side addressing one or more different requirements. For example, one side providing for moisture collection and the other aiding in sealing.

In one implementation, water vapor that condenses on the upper surface of the hydrophilic material (e.g. felt strips 46), may be transferred via one or more ports 48 on a lower portion of the wetting apparatus 10, to a water storage receptacle (not shown) for eventual reuse/recycling. From the ports 48, the condensed water may travel through tubing to the water storage receptacle. In some instances, the user may select which of the one or more ports 48 is utilized, providing a further way in which to control the flow rate of steam in the steam chamber 34, and enabling a uniform distribution of water vapor to be maintained. In other instances, which of the one or more ports 48 to utilize may be selected automatically, based on the data from sensors which identify the level or condensed water vapor extraction at each of the ports 48. The hydrophilic material may be continuously wetted or saturated with an aqueous solution to enable it to absorb and entrap condensed vapor, while permitting the water vapor to be drawn through the vacuum. In some implementations, at one or more locations, the hydrophilic material may extend from the upper surface to the ports 48, providing a transfer mechanism for the condensed water to the ports 48.

Additional sensors may be incorporated to ensure that the wetting apparatus 10 is always provided with a source of steam 18', and does not run dry. Additional sensors may also be provided to ensure that the hydrophilic material (e.g. felt strips 46) maintain a required saturation level to ensure that condensed water vapor can be extracted via the applied vacuum.

In a further implementation, as also shown in FIG. 4, the wetting apparatus 10 can be lifted using an elevation mechanism 50, which raises a table on which the entire wetting apparatus 10 is located in an upwards direction to expose the felt strips 46 so that they can be replaced or cleaned if required, separating the wetting apparatus 10 from the substrate 16.

The elevation mechanism 50 may be operated manually, or electronically. In another implementation the wetting apparatus 10 may be hinged along one edge, such that it can be rotated to expose the felt strips 46 so that they can be replaced or cleaned if required. Rails or locations structures (not shown) can be provided either side of the substrate 16 providing a defined location for the wetting apparatus 10 to reside, such that when lowered down towards the substrate 16, the edges of the wetting apparatus 10 align and seal against the felt 46. The weight of the wetting apparatus 10 may additionally aid in facilitating sealing.

Figure 5:
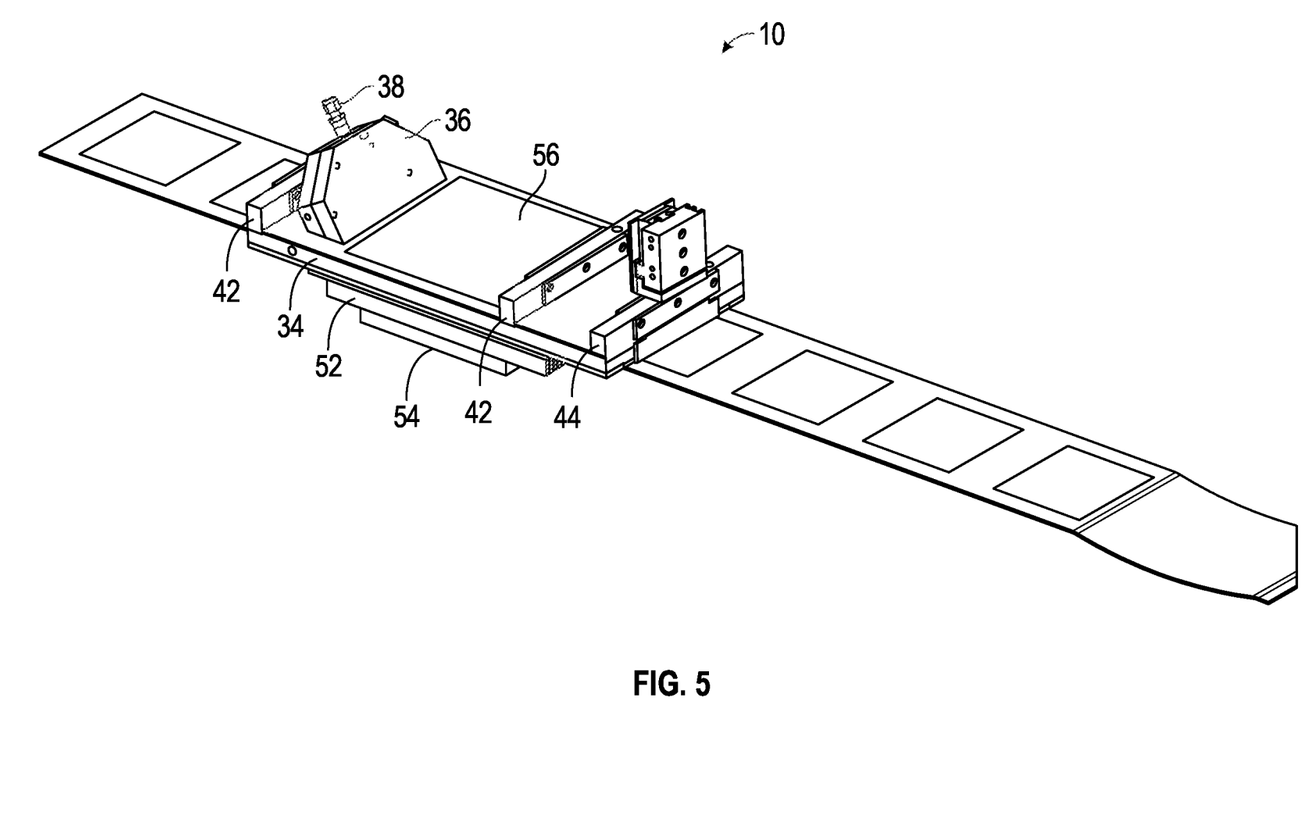
FIG. 5 shows a perspective view of the wetting apparatus, including the use of a heatsink under the substrate, opposite the wetting apparatus above the substrate, in accordance with aspects of the present disclosure.
Figure 6:
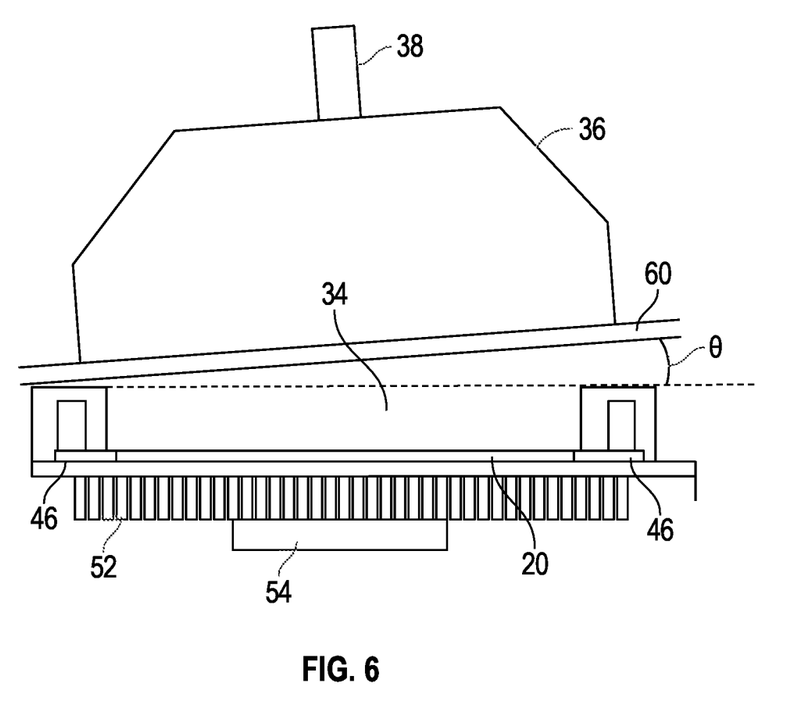
FIG. 6 shows a cutaway end view of the wetting apparatus, including tilting a table the steaming head is mounted on to prevent possible water contamination in the steam chamber, in accordance with aspects of the present disclosure.

Referring now to FIGS. 5 and 6, a heat sink 52 may be provided beneath the substrate 16, opposite the wetting apparatus 10 and the steaming head 36, to disperse heat generated in the wetting apparatus 10 away from the bottom surface of the supporting substrate 16. By virtue of this, the substrate 16, which is typically formed of mylar, does not suffer any heat damage from the steaming operation. It is noted, of course, that other materials could be used for the substrate 16. The dimensions of the heatsink 52 can be adjusted accordingly to ensure that the substrate 16 itself is not damaged by the steaming operation occurring within the steam housing 32 located directly above the heatsink 52. The heatsink 52 also helps control the temperature of the powder 20 to ensure steam absorption and condensation.

In one implementation, a fan 54 may be provided adjacent the heat sink 52, to further enhance heat dissipation away from the heat sink 52. FIG. 5 also shows the vacuum apparatuses 42 for condensed water removal and the substrate cleaning actuator 44, shown in more detail in FIG. 3.

In another implementation, a heating device, such as heating pad 56, may be disposed on the upper surface of the steam chamber 34 (see FIG. 3) to reduce or at least minimize moisture condensing on the inner surface of the steam chamber 34, above the substrate. The heating device 56 may be located on an outer surface of the steam chamber 34, inner surface of the upper surface of the steam chamber 34, or integrated therein.

Referring to FIG. 6, a mounting table 60 on which the steaming head 36 is mounted is configured to be tilted at an angle θ to ensure that the steam dispersed from the steaming head 36 does not condense and sit on a surface of the mounting table 60, which could create possible water contamination. In one embodiment, the mounting table 60 is fixed at an angle θ, in another the mounting table 60 is configured such that the angle θ can be adjusted.

Referring to FIG. 7, a system interface 70 is shown to generate and control the steam used by the steaming head 36 in the steam housing 32 shown, for example, in FIGS. 3 and 4. Specifically, the system interface 70 includes a precision pump 72 which receives water from a water inlet 74, and which pumps a precise predetermined amount of the water to an evaporator 75. The evaporator 75 boils the water from the pump 72 to generate steam 18' and applies the steam to a steam line 76, which, in turn, passes the steam 18' to the steam source input 38 on the steaming head 36 within the steam housing 32. As shown in FIG. 7, optionally, the steam line 76 can be between 1-3 meters long and can be heated (to preserve the steam). In an alternative implementation, a mass flow controller (not shown) can be included after the evaporator 75 to meter and control the rate of steam 18' supplied to the steam chamber 34 by the evaporator 75.

Still referring to FIG. 7, in order to ensure that the appropriate amount and temperature of steam is generated, various sensors can be used. Specifically, a temperature sensor 77 can be provided between the evaporator 75 and the steam line 76 to ensure that the steam output of the evaporator 75 is sufficient. If the steam temperature is in excess of a predetermined appropriate temperature, then the pump 72 and the evaporator 75 can be controlled to decrease the steam temperature. Alternatively, if the temperature sensor 77 indicates that the steam temperature is too low, the pump 72 and/or evaporator 75 can be adjusted to increase the steam temperature. A display and a controller 78, as shown in FIG. 7, allows an operator to control this. Alternatively, a feedback control system (not shown) can be used to perform this adjustment operation automatically. In addition, control of the pump 72 and evaporator 75 can also be affected based on an output of an optional external sensor 79 located in the steam housing 32, which can measure temperature, volume and pressure of the steam within the steam housing 32, as described above with reference to FIG. 3.

The rate and temperature of steam generation controlled by the system interface 70 of FIG. 7, the temperature range of the heater 40 located on the steam chamber 34/steaming head 36, and the speed of the substrate 16, for example, can all be selected based on the substrate 16 used, powder materials 20 deposited on the substrate 16, etc. The aim is to ensure that the dispersed powder 20 is not damaged, and sufficient lubrication/wetting is provided to improve flowability, but not so much that the wetting agent 18 spreads beyond the desired powder boundaries. Additionally, the steam 18' generated, and the lubrication/wetting provided should be selected such that a Mylar surface (such as a surface of a calendering roller 24) placed on the lubricated/wetted powder deposition surface, does not "pick up" any of the deposited powder 20, i.e., the powder does not adhere to it. To aid in the control of these parameters, additional sensors may be incorporated into the system. For example, sensors may be provided to measure the powder temperature, and a feedback control system (not shown) can be used to adjust the steam generation and/or the heatsink 52, such that the steam generator (e.g., the evaporator 75) and/or heat sink 52 may assist in controlling the powder temperature. Such additional sensors can monitor the powder temperature for condensation and absorption. The sensors can also provide information that can be used for automation of the manufacturing operations, if desired. The heat sink 52 may also have a water-cooling mechanism to control the temperature.

Figure 8:
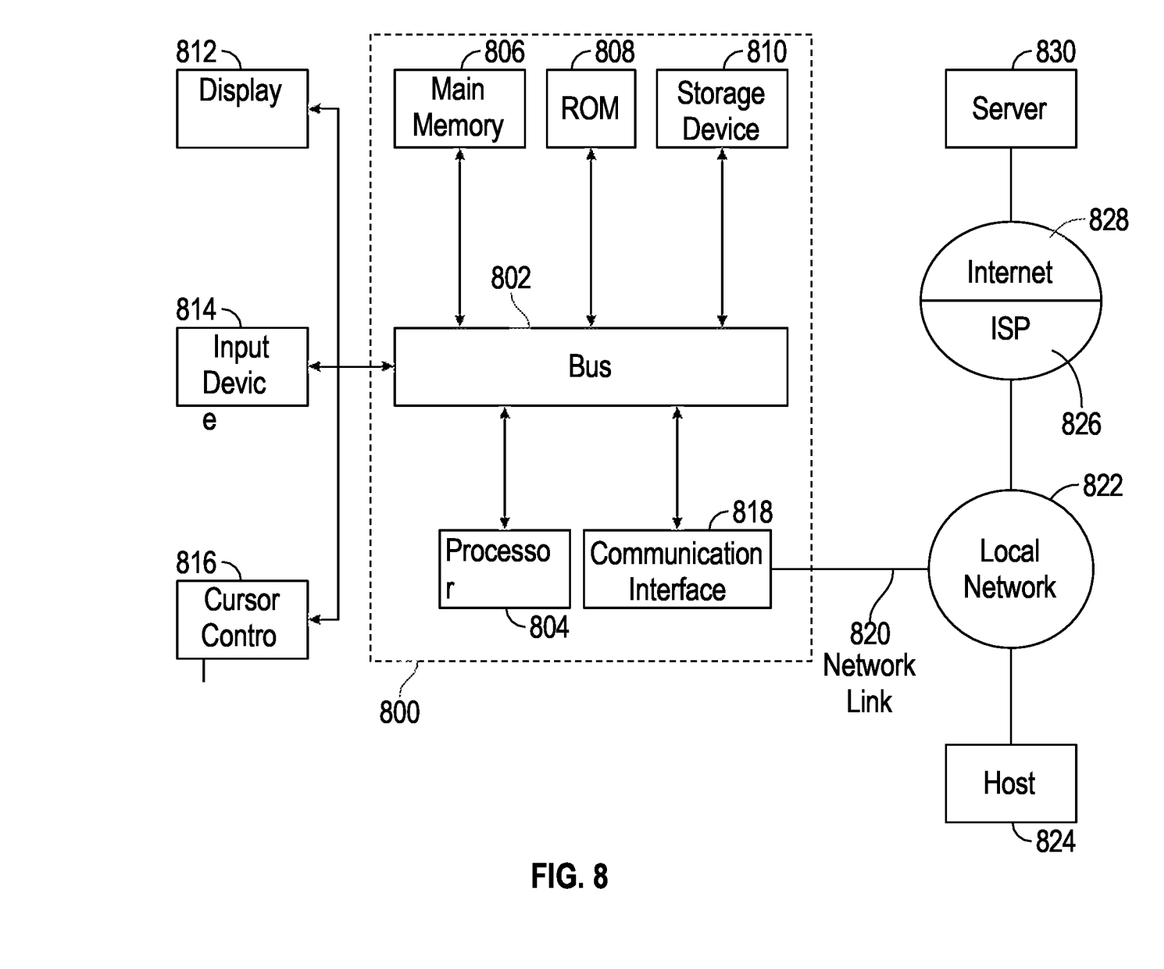
FIG. 8 is a block diagram showing an example computer system upon which aspects of this disclosure may be implemented.

FIG. 8 is a block diagram showing an example a computer system 800 upon which aspects of this disclosure, for example the display and controller 78 shown in FIG. 7, or a feedback control system, as mentioned above, may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. The computer system 800 may implement, for example, as the display and controller 78 shown in FIG. 7, of a feedback control system, as discussed above, to carry out the operations discussed above with reference to FIGS. 1-7.

The computer system 800 may further include a read only memory (ROM) 808 or other static storage device coupled to the bus 802 for storing static information and instructions for the processor 804. A storage device 810, such as a flash or other non-volatile memory may be coupled to the bus 802 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include physical structure, or virtual implementation, or both, providing user input modes or options, and a cursor control 816 for controlling, for example, a cursor, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program.

It is noted that although the above description has primarily been presented in terms of wetting powder in the environment of 3D printing, the apparatus and method of this disclosure is not limited to only powder wetting for 3D printers, and they could be used in any situation where it is desired to wet powder to keep the powder intact for subsequent processing.

It will be apparent that though the embodiment described and illustrated is for a substrate in the form or a moving substrate, such as a conveyor belt, the teaching disclosed herein may be applied to discrete substrate segments, or individual substrate segments.

In the following, further features, characteristics and advantages of the invention will be described by means of items:

Item 1. An apparatus including a powder dispenser configured to dispense powder onto a substrate, a calender comprised of a top roller, located above the powder on the substrate, a conditioning apparatus located between the powder dispenser and the calender in a direction of movement of the substrate, wherein the conditioning apparatus is configured to apply a conditioning agent to the powder on the substrate before the powder passes through the calender, wherein the conditioning agent is comprised of a material which increases cohesiveness of the powder.

Item 2. The apparatus of item 1, wherein the top roller has a controlled surface energy coating configured to prevent the powder from adhering to the top roller.

Item 3. The apparatus of item 1 or 2, further comprising a covering layer located between the top roller and an upper surface of the powder on the substrate and configured to prevent the powder from adhering to the top roller.

Item 4. The apparatus of any one of items 1-3, further comprising a dryer, located after the calender along the direction of movement of the substrate, the dryer being configured to dry the powder on the substrate after it has passed through the calender.

Item 5. The apparatus of any one of items 1-4, wherein the conditioning apparatus comprises a wetting apparatus, and the wetting apparatus comprising a steaming head configured to apply steam to the powder on the substrate as a wetting agent.

Item 6. The apparatus of any one of items 1-5, wherein the steaming head is located in a steam housing comprising a steam chamber covering a portion of the substrate along the direction of travel of the substrate, the steam chamber being configured to confine steam from the steaming head to the portion of the substrate located within the steam chamber.

Item 7. The apparatus of any one of items 1-6, further comprising at least one vacuum apparatus located in the steam housing of the wetting apparatus, adjacent to the steaming head, and configured to remove excess steam and condensation generated by the steaming head in the steam housing.

Item 8. The apparatus of any one of items 1-7, wherein the wetting apparatus is configured to continuously generate steam at the steaming head while the substrate moves through the wetting apparatus.

Item 9. The apparatus of any one of items 1-8, further comprising a sensor for sensing when powder is on a portion of the substrate that is under the steaming head, wherein the wetting apparatus is configured to only generate steam from the steaming head when the sensor determines that there is powder on the portion of the substrate under the steaming head.

Item 10. The apparatus of any one of items 1-9, further comprising a heater located adjacent to the steaming head and configured to maintain steam in the steaming head.

Item 11. The apparatus of any one of items 1-10, further comprising an elevation mechanism configured to separate the wetting apparatus from the substrate.

Item 12. The apparatus of any one of items 1-11, further comprising a heat sink located under the substrate opposite the steam housing of the wetting apparatus.

Item 13. The apparatus of any one of items 1-12, further comprising a sensor configured to measure powder temperature.

Item 14. The apparatus of any one of items 1-13, further comprising a sensor configured to measure temperature of steam as it enters the steam chamber.

Item 15. The apparatus of any one of items 1-14, wherein the heat sink is configured to have a controllable heat capacity to control powder temperature.

Item 16. The apparatus of any one of items 1-15, further comprising a bottom roller located under the substrate, opposite to the top roller, so that the substrate is located between the top and bottom roller.

Item 17. The apparatus of any one of items 1-16, wherein the substrate is comprised of a conveyor belt.

Item 18. The apparatus of any one of items 1-17, further comprising a substrate cleaning actuator configured to blow air onto the substrate in areas where powder is not deposited to clean off any excess powder that may have drifted onto those portions of the substrate.

Item 19. The apparatus of any one of items 1-18, wherein the substrate cleaning actuator is configured to be lowered and raised to come into and out of contact with the substrate.

Item 20. A method including dispensing powder onto a substrate, applying a conditioning agent to the dispensed powder on the substrate before the powder passes through the calender, and compacting the powder, after the conditioning agent is applied, wherein the conditioning agent is comprised of a material which increases cohesiveness of the powder to provide for uniform compaction of the powder during compacting.

Item 21: The method of item 20, further comprising drying the powder after compacting the powder.

Item 22: The method of item 20 or 21, wherein the conditioning agent is steam applied by a steaming head.

Item 23: The method of any one of items 20-22, wherein the steaming head is located in a steam housing comprising a steam chamber covering a portion of the substrate along the direction of travel of the substrate.

Item 24: The method of any one of items 20-23, further comprising applying a vacuum by at least one vacuum apparatus located in the steam housing, adjacent to the steaming head, to remove excess steam and condensation generated by the steaming head in the steam housing.

Item 25: The method of any one of items 20-24, further comprising continuously generating steam at the steaming head while the substrate moves through the wetting apparatus.

Item 26: The method of any one of items 20-25, further comprising sensing, via a sensor, when powder is on a portion of the substrate that is under the steaming head, wherein steam is only generated from the steaming head when the sensor determines that there is powder on the portion of the substrate under the steaming head.

Item 27: The method of any one of items 20-26, further comprising heating the steaming head to maintain steam in the steaming head.

Item 28: The method of any one of items 20-27, further comprising elevating the steaming head to separate the wetting apparatus from the substrate.

Item 29: The method of any one of items 20-28, further comprising removing heat from the substrate via a heat sink located under the substrate opposite the steam housing.

Item 30: The method of any one of items 20-29, further comprising measuring temperature of the powder by a sensor.

Item 31: The method of any one of items 20-30, further comprising measuring temperature of steam as it enters the steam chamber.

Item 32: The method of any one of items 20-31, further comprising controlling powder temperature via a heat sink having a controllable heat capacity.

Item 33: The method of any one of items 20-32, wherein compacting the powder is performed by passing the powder through a calender including a top roller above the substrate and a bottom roller located under the substrate, opposite to the top roller.

Item 34: The method of any one of items 20-33, further comprising blowing air onto the substrate with a substrate cleaning actuator in areas where powder is not deposited to clean off any excess powder that may have drifted onto those portions of the substrate.

Item 35: The method of any one of items 20-34, further comprising raising and lowering the substrate cleaning actuator to come into and out of contact with the substrate.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The invention claimed is:

1. An apparatus, comprising:
a powder dispenser, the powder dispenser configured to dispense powder onto a substrate;
a blade for controlling the thickness of the powder on the substrate and promoting uniformity of the powder;
a calender, the calender comprising a top roller, the top roller configured to be located above the powder on the substrate;
a wetting apparatus, the wetting apparatus configured to be located between the powder dispenser and the calender, the wetting apparatus comprising a steam head, the steam head configured to apply steam to the powder prior to the powder passing through the calender;
a sensor for sensing when powder is on a portion of the substrate under the steam head;
a vacuum positioned adjacent to the steam head and configured to control the vapor flow rate to control the moisture received by the dispensed powder; and
wherein the wetting apparatus is configured to generate steam based on a determination of the powder being on a portion of the substrate under the steam head; and
wherein the substrate comprises a conveyor belt, the conveyor belt configured to move the powder through the wetting apparatus and the calender.

2. The apparatus of claim 1, wherein the top roller comprises a controlled surface energy coating configured to prevent the powder from adhering to the top roller.

3. The apparatus of claim 1, further comprising a covering layer positioned between the top roller and an upper surface of the powder on the substrate, the covering layer configured to prevent the powder from adhering to the top roller.

4. The apparatus of claim 3, further comprising a dryer configured to dry the powder on the substrate.

5. The apparatus of claim 1, wherein the steam head is located in a steam housing, the steam housing comprising a steam chamber covering a portion of the substrate.

6. The apparatus of claim 5, wherein the vacuum is positioned inside the steam housing and further ratus configured to removes excess steam and condensation generated by the steam head in the steam housing.

7. The apparatus of claim 1, wherein the wetting apparatus is configured to continuously generate steam at the steam head while the substrate moves through the wetting apparatus.

8. The apparatus of claim 1, wherein the wetting apparatus is configured to only generate steam from the steam head when the sensor determines that there is powder on the portion of the substrate under the steam head.

9. The apparatus of claim 1, further comprising a heater located adjacent to the steam head and configured to maintain steam in the steam head.

10. The apparatus of claim 1, further comprising an elevation mechanism, the elevation mechanism configured to separate the wetting apparatus from the substrate.

11. The apparatus of claim 5, further comprising a heat sink, the heat sink being located under the substrate and opposite the steam housing of the wetting apparatus.

12. The apparatus of claim 1, further comprising a sensor, the sensor being configured to measure powder temperature.

13. The apparatus of claim 5, further comprising a sensor, the sensor being configured to measure temperature of steam as it enters the steam chamber.

14. The apparatus of claim 11, wherein the heat sink is configured to have a controllable heat capacity to control powder temperature.

15. The apparatus of claim 1, further comprising a bottom roller, the bottom roller configured to be located under the substrate and opposite to the top roller so that the substrate is located between the top roller and the bottom roller.

16. The apparatus of claim 1, wherein the substrate comprises one or more segments containing dispensed powder.

17. The apparatus of claim 1, further comprising a substrate cleaning actuator, the substrate cleaning actuator configured to blow air onto the substrate in areas where powder is not to be deposited to clean off excess powder.

18. The apparatus of claim 17, wherein the substrate cleaning actuator is configured to be lowered and raised to come into and out of contact with the substrate.

19. An apparatus, comprising:
a powder dispenser, the powder dispenser configured to dispense powder onto a substrate, the substrate comprising one or more segments for receiving powder dispensed by the powder dispenser;
a blade for controlling the thickness of the powder on the substrate and promoting uniformity of the powder;
a calender, the calender comprising a top roller and a bottom roller, the top roller being located above the powder dispensed on the substrate, and the bottom roller being located under the substrate and opposite to the top roller, the substrate being located between the top roller and the bottom roller;
wherein the top roller comprises a controlled surface energy coating configured to contact the dispensed powder and prevent the dispensed powder from adhering to the top roller;
a conditioning apparatus, the conditioning apparatus being located between the powder dispenser and the calender, wherein the conditioning apparatus is configured to apply a conditioning agent to the powder on the substrate before the powder passes through the calender;
a sensor for sensing when powder is on a portion of the substrate under the conditioning apparatus; and
a vacuum positioned adjacent to the conditioning apparatus and configured to control the conditioning agent flow rate to control the amount of conditioning agent received by the dispensed powder; and
wherein the conditioning agent comprises a material that increases the cohesiveness of the powder.

20. An apparatus, comprising:
a powder dispenser, the powder dispenser configured to dispense powder onto a substrate, wherein the substrate comprises a conveyor belt;
a calender, the calender comprising a top roller, the top roller configured to be located above the powder on the substrate;
a blade for controlling the thickness of the dispensed powder on the substrate and promoting uniformity of the dispensed powder;
a conditioning apparatus, the conditioning apparatus being located between the powder dispenser and the calender, wherein the conditioning apparatus is configured to apply a conditioning agent to the powder on the substrate before the powder passes through the calender;
a sensor for sensing when powder is on a portion of the substrate under the conditioning apparatus; and
a vacuum positioned adjacent to the conditioning apparatus and configured to control the conditioning agent flow rate to control the amount of conditioning agent received by the dispensed powder; and
wherein the conditioning agent comprises a material that increases the cohesiveness of the powder; and
wherein the conveyor belt is configured to move the powder through the conditioning apparatus and the calender to increase the cohesiveness of the powder then compact the powder.

* * * * *